US010480521B2

(12) United States Patent
Sharpe, Jr. et al.

(10) Patent No.: US 10,480,521 B2
(45) Date of Patent: Nov. 19, 2019

(54) METHODS AND APPARATUS FOR DETECTING AND PREVENTING COMPRESSOR SURGE

(71) Applicant: Fisher-Rosemount Systems, Inc., Round Rock, TX (US)

(72) Inventors: Joseph H. Sharpe, Jr., Round Rock, TX (US); Mikhail Ilchenko, Moscow (RU); Gary Hawkins, Burr Ridge, IL (US); George William Thackston, III, Peachtree Corners, GA (US); Marcos Peluso, Chanhassen, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 233 days.

(21) Appl. No.: 15/291,456

(22) Filed: Oct. 12, 2016

(65) Prior Publication Data
US 2017/0284410 A1 Oct. 5, 2017

(30) Foreign Application Priority Data

Apr. 1, 2016 (RU) ................................ 2016112469

(51) Int. Cl.
*F04D 27/02* (2006.01)
*G05D 7/06* (2006.01)
*F04D 29/26* (2006.01)

(52) U.S. Cl.
CPC ........... *F04D 27/0223* (2013.01); *G05D 7/06* (2013.01); *F04D 29/26* (2013.01)

(58) Field of Classification Search
CPC ........ F04D 27/0223; F04D 29/26; G05D 7/06
(Continued)

(56) References Cited

U.S. PATENT DOCUMENTS 4,111,637 A 9/1978 Hillman, II
4,464,720 A * 8/1984 Agarwal ............. F04D 27/0207
415/1

(Continued)

FOREIGN PATENT DOCUMENTS

CN 203627330 6/2014
CN 104373251 2/2015
(Continued)

OTHER PUBLICATIONS

Intellectual Property Office, "Search Report under Section 17(5)," issued in connection with Great Britain Application No. GB1704514.7, dated Sep. 14, 2017, 6 pages.
(Continued)

*Primary Examiner* — Brian W Wathen
*Assistant Examiner* — Mohammed Shafayet
(74) *Attorney, Agent, or Firm* — Hanley, Flight & Zimmerman, LLC

(57) ABSTRACT

Methods and apparatus are disclosed for detecting and preventing compressor surge. A transmitter determines a derivative process value of a compressor. A controller obtains the derivative process value from the transmitter. The transmitter is separate from the controller. The controller compares the derivative process value to a threshold value. The threshold value is indicative of the initiation of a surge event in the compressor. In response to determining that the derivative process value fails to satisfy the threshold value, the controller actuates a valve operatively coupled to the compressor to enable an additional derivative process value of the compressor determined by the transmitter to satisfy the threshold value.

20 Claims, 6 Drawing Sheets

(58) Field of Classification Search
USPC .......................................................... 700/282
See application file for complete search history.

(56) References Cited

U.S. PATENT DOCUMENTS

| | | | | |
|---|---|---|---|---|
| 4,679,992 | A * | 7/1987 | Watanabe | F02B 41/10 417/364 |
| 4,936,741 | A * | 6/1990 | Blotenberg | F04D 27/0207 415/27 |
| 4,948,332 | A * | 8/1990 | Blotenberg | F04D 27/0207 415/27 |
| 5,095,714 | A * | 3/1992 | Adachi | F25B 49/022 415/48 |
| 5,306,116 | A * | 4/1994 | Gunn | F04D 27/02 415/17 |
| 5,683,223 | A * | 11/1997 | Harada | F04D 27/02 415/17 |
| 5,798,941 | A * | 8/1998 | McLeister | G05B 11/42 415/1 |
| 6,164,901 | A | 12/2000 | Blotenberg | |
| 6,213,724 | B1 * | 4/2001 | Haugen | F04D 27/02 417/18 |
| 6,532,433 | B2 | 3/2003 | Bharadwaj et al. | |
| 7,096,669 | B2 | 8/2006 | Narayanan et al. | |
| 7,396,604 | B2 | 7/2008 | Rainville | |
| 7,608,353 | B2 | 10/2009 | Rainville | |
| 8,342,794 | B2 | 1/2013 | Staroselsky et al. | |
| 9,051,890 | B2 | 6/2015 | Sumilla et al. | |
| 2003/0077163 | A1 * | 4/2003 | Eveker | F04D 27/0207 415/1 |
| 2005/0154479 | A1 * | 7/2005 | Narayanan | F04D 27/0207 700/75 |
| 2005/0234634 | A1 * | 10/2005 | Beyer | F02D 41/222 701/114 |
| 2007/0193333 | A1 * | 8/2007 | Wobben | F03D 17/00 73/1.29 |
| 2008/0082180 | A1 * | 4/2008 | Blevins | G05B 11/42 700/29 |
| 2010/0296914 | A1 * | 11/2010 | Staroselsky | F04D 27/001 415/47 |
| 2011/0130883 | A1 * | 6/2011 | Van Dijk | F04D 25/04 700/282 |
| 2012/0121376 | A1 * | 5/2012 | Huis In Het Veld | F04D 27/0207 415/1 |
| 2012/0183385 | A1 * | 7/2012 | Narayanan | F04D 27/001 415/1 |
| 2013/0156544 | A1 * | 6/2013 | Sishtla | F04D 27/0261 415/1 |
| 2014/0249653 | A1 * | 9/2014 | Blevins | G05B 19/058 700/21 |
| 2014/0249654 | A1 * | 9/2014 | Blevins | G05B 19/058 700/21 |
| 2015/0047339 | A1 | 2/2015 | Rollinger et al. | |
| 2015/0047341 | A1 | 2/2015 | Ulrey et al. | |
| 2015/0090445 | A1 * | 4/2015 | Miller | E21B 43/121 166/255.1 |
| 2015/0147193 | A1 | 5/2015 | Grassens et al. | |
| 2016/0025596 | A1 * | 1/2016 | Heda | G01M 15/14 73/112.06 |

FOREIGN PATENT DOCUMENTS

| | | |
|---|---|---|
| DE | 102004051808 | 1/2013 |
| DE | 102014215194 | 2/2015 |
| EP | 0185601 | 6/1986 |
| EP | 0368557 | 5/1990 |
| EP | 0967396 | 5/2003 |
| JP | H03100398 | 4/1991 |
| JP | H06272695 | 9/1994 |
| WO | 2013110324 | 8/2013 |
| WO | 2014191051 | 12/2014 |
| WO | 2015077282 | 5/2015 |

OTHER PUBLICATIONS

CCC, "Antisurge & Performance Control," Dec. 6, 2012, retrieved from <http://www.cccglobal.com/sites/default/files/documents/Antisurge%20Control%20and%20Performance.pdf>, retrieved on Jul. 28, 2015, 2 pages.

Emerson, "Anti-Surge Compressor Control in Action," May 2014, retrieved from <http://www.emersonprocessexperts.com/2014/05/anti-surge-compressor-control-in-action/>, retrieved on Oct. 29, 2015, 3 pages.

* cited by examiner

US 10,480,521 B2

METHODS AND APPARATUS FOR DETECTING AND PREVENTING COMPRESSOR SURGE

RELATED APPLICATIONS

This patent claims priority to Russian Patent Application Serial No. 2016112469, filed Apr. 1, 2016, entitled "Methods and Apparatus for Detecting and Preventing Compressor Surge." The entirety of Russian Patent Application Serial No. 2016112469 is hereby incorporated herein by reference.

FIELD OF THE DISCLOSURE

This present disclosure relates generally to compressors and, more particularly, to methods and apparatus for detecting and preventing compressor surge.

BACKGROUND

Centrifugal compressors are used across many industries to compress gas from a lower pressure to a higher pressure. Lower pressure gas is suctioned into the compressor via an inlet and discharged from the compressor as higher pressure gas via an outlet. In some instances, a portion of the higher pressure gas that would otherwise be discharged via the outlet may instead be diverted to a recycle valve or a blow-off valve operatively coupled to the compressor. The recycle or blow-off valve may be actuated to prevent surge based on a control algorithm executed in a controller.

SUMMARY

Example methods and apparatus for detecting and preventing compressor surge are described. An example apparatus includes a transmitter and a controller. The transmitter is to determine a derivative process value of a compressor. The controller is to obtain the derivative process value from the transmitter. The transmitter is separate from the controller. The controller is to compare the derivative process value to a threshold value. The threshold value is indicative of the initiation of a surge event in the compressor. In response to determining that the derivative process value fails to satisfy the threshold value, the controller is to actuate a valve operatively coupled to the compressor to enable an additional derivative process value of the compressor determined by the transmitter to satisfy the threshold value.

An example method includes obtaining, at a controller, a derivative process value of a compressor determined by a transmitter. The transmitter is separate from the controller. The method includes comparing the derivative process value to a threshold value. The threshold value is indicative of the initiation of a surge event in the compressor. The method includes, in response to determining that the derivative process value fails to satisfy the threshold value, actuating a valve operatively coupled to the compressor to enable an additional derivative process value of the compressor determined by the transmitter to satisfy the threshold value.

An example tangible machine-readable storage medium includes instructions that, when executed, cause a machine to obtain, at a controller, a derivative process value of a compressor determined by a transmitter. The transmitter is separate from the controller. The instructions cause the machine to compare the derivative process value to a threshold value. The threshold value is indicative of the initiation of a surge event in the compressor. The instructions cause the machine, in response to determining that the derivative process value fails to satisfy the threshold value, to actuate a valve operatively coupled to the compressor to enable an additional derivative process value of the compressor determined by the transmitter to satisfy the threshold value.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
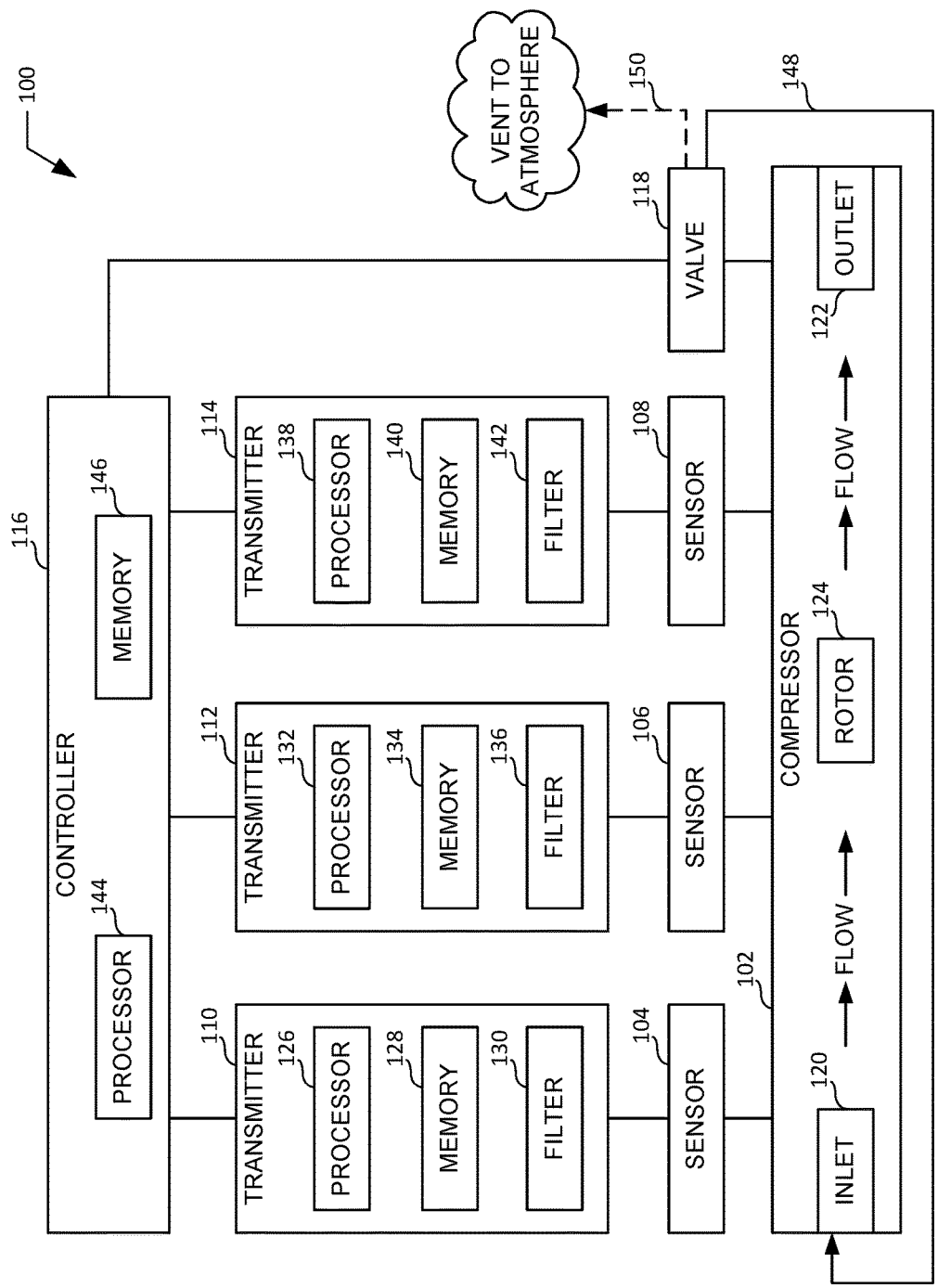
FIG. 1 is a block diagram of an example surge detection apparatus for detecting the initiation of a surge event in an example compressor.

As a compressor compresses gas from a lower pressure to a higher pressure, a pressure differential is developed across a bladed rotor of the compressor that separates the zone of lower pressure gas from the zone of compressed higher pressure gas. Natural forces acting within the compressor attempt to create a state of equilibrium between the zone of lower pressure gas and the zone of higher pressure gas. Accordingly, such natural forces create a tendency for gas within the higher pressure zone to migrate toward the lower pressure zone.

To counteract the aforementioned tendency and maintain the flow of gas from the zone of lower pressure toward the zone of higher pressure, additional energy must be transferred to the gas from the blades of the rotor. Such an energy transfer is possible only when the gas is moving smoothly along the blades of the rotor with a relatively high velocity. In some instances, potential energy resisting the flow of gas from the zone of lower pressure to the zone of higher pressure causes the gas velocity to drop, which in turn may cause one or more of the blade(s) of the rotor to lose its aerodynamic properties. As a result, the gas separates from the surface(s) of the blade(s), often causing the compressor to stall. This condition and/or state of the compressor is known as surge.

The occurrence of a surge event causes a reversal of the mechanical forces acting on the rotor in the axial direction, and may also result in an imbalance of the mechanical forces acting on the rotor in the radial direction. Such reversal and/or imbalance of forces associated with the occurrence of a surge event is dangerous to the compressor and may lead to the destruction of the compressor. Accordingly, it is advantageous to implement methods and/or apparatus capable of preventing, detecting and/or responding to the initiation of a surge event.

The initiation and/or occurrence of a surge event in a compressor is a very fast phenomenon. A drop in the pressure of the gas flowing within the compressor that may correspond to the initiation of a surge event can occur in about fifty (50) milliseconds. The full duration of the surge event may be on the order of three (3) seconds or less, sometimes as little as a fraction of a second. Accordingly, changes in the process values (e.g., rate of change of pressure and/or flow) that may correlate to the initiation of a surge event occur rapidly and have a very brief duration.

Conventional surge prevention and/or surge detection systems implement a single controller having expensive (and often customized) processing hardware used to calculate, compute and/or determine various process parameters and/or values relating to the operation of the compressor. Such conventional systems utilize such process parameters and/or values in conjunction with algorithms that control various processes attempting to prevent and/or detect the initiation and/or occurrence of a surge event in the compressor. Such conventional systems, however, must share the processing resources available via the single controller to manage various processing functions associated with the operation of the controller, including those associated with processing the aforementioned surge prevention and/or surge detection algorithms. As a result, such conventional systems may in some instances experience latency caused by an undesirably slow sampling rate of the controller, and/or may be unable to provide a rapid control response in connection with detecting the initiation and/or occurrence of a surge event.

Example methods and apparatus disclosed herein detect the initiation of a surge event in a compressor. By moving certain processing functions from the single controller utilized in the aforementioned conventional systems to a separate transmitter capable of processing data at a relatively higher rate, the example methods and apparatus disclosed herein advantageously improve the speed of a control response associated with detecting the initiation of a surge event in a compressor. For example, the methods and apparatus disclosed herein include a transmitter capable of rapidly determining one or more derivative process values that, in the aforementioned conventional systems, would otherwise need to be determined by the controller. As a result of offloading the determination of the derivative process value(s) to a high-speed transmitter, latency issues associated with the sampling and/or processing capabilities of the dedicated controller of the aforementioned conventional systems can be avoided, and the costly dedicated controller may be replaced by a lower-cost controller having relatively slower processing capabilities.

The example methods and apparatus disclosed herein also advantageously implement redundant transmitters to verify the reliability of data determined by the transmitters. Such redundant transmitters reduce the potential that data being determined by any one of the transmitters and utilized by the controller to detect the initiation of a surge event constitutes a false-positive.

FIG. 1 is a block diagram of an example surge detection apparatus 100 for detecting the initiation of a surge event in an example compressor 102. The example surge detection apparatus 100 includes the compressor 102, an example first sensor 104, an example second sensor 106, an example third sensor 108, an example first transmitter 110, an example second transmitter 112, an example third transmitter 114, an example controller 116, and an example valve 118.

In the illustrated example of FIG. 1, the compressor 102 includes an example inlet 120, an example outlet 122, and an example rotor 124. Gas passing through the compressor 102 is suctioned or drawn into the compressor 102 via the inlet 120 and discharged from the compressor 102 via the outlet 122. Rotation of the rotor 124 within the compressor 102 causes energy to be transferred to the gas flowing from the inlet 120 toward the outlet 122 as the gas passes across the rotor 124, thereby resulting in the development of a pressure differential across the compressor 102. Thus, a zone of lower pressure exists between the inlet 120 and the rotor 124 relative to a zone of higher pressure existing between the rotor 124 and the outlet 122.

In the illustrated example of FIG. 1, the first sensor 104 is operatively coupled to the compressor 102. In some examples, the first sensor 104 is coupled to the inlet 120 of the compressor 102. In other examples, the first sensor 104 is coupled to the outlet 122 of the compressor 102. The first sensor 104 senses and/or measures data corresponding to a process value of the compressor 102. For example, the first sensor 104 may sense and/or measure the pressure of a gas flowing through the compressor 102. As another example, the first sensor 104 may sense and/or measure the velocity and/or flow rate of a gas flowing through the compressor 102.

In the illustrated example of FIG. 1, the second and third sensors 106, 108 are also operatively coupled to the compressor 102. In some examples, the second and/or third sensors 106, 108 is/are coupled to the inlet 120 of the compressor 102. In other examples, the second and/or third sensors 106, 108 is/are coupled to the outlet 122 of the compressor 102. The second and third sensors 106, 108 sense and/or measure data corresponding to a process value of the compressor 102. In some examples, the second and third sensors 106, 108 may sense and/or measure data corresponding to process values that are the same as the process value associated with the first sensor 104. For example, each of the first, second and third sensors 104, 106, 108 may sense and/or measure the pressure of a gas flowing through the compressor 102. In other examples, one or both of the second and/or third sensors 106, 108 may sense and/or measure data corresponding to process values that are different from the process value associated with the first sensor 104. For example, the first and second sensors 104, 106 may sense and/or measure the pressure of a gas flowing through the compressor 102, while the third sensor 108 may sense and/or measure the velocity and/or flow rate of a gas flowing through the compressor 102.

While the example surge detection apparatus 100 illustrated in FIG. 1 includes three sensors (e.g., the example first, second and third sensors 104, 106, 108), the surge detection apparatus 100 may include any number of sensors, including without limitation only a single sensor (e.g., the example first sensor 104).

In the illustrated example of FIG. 1, the first transmitter 110 is operatively coupled to the first sensor 104. The first transmitter 110 includes an example processor 126, an example memory 128, and an example filter 130. The first transmitter 110 may be analog or digital. In some examples, the first transmitter 110 may be configured to communicate via a Foundation Fieldbus communication protocol, via a Highway Addressable Remote Transducer (HART) communication protocol, via 4-20 milliamp (mA) wiring, and/or via any other industrial communication protocol.

Data obtained from and/or provided by the first sensor 104 may be stored in the memory 128. The processor 126 may access such data from the memory 128, or may alternatively receive such data directly from the first sensor 104. The memory 128 may be implemented by any type(s) and/or any number(s) of volatile memory, non-volatile memory, a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which data is stored for any duration (e.g., for extended time periods, permanently, brief instances, for temporarily buffering, and/or for caching of the data). The data stored in the memory 128 may be stored in any file and/or data structure format, organization scheme, and/or arrangement.

The first transmitter 110, via the processor 126, collects and/or obtains one or more process values from the first sensor 104. For example, the first transmitter 110 may collect and/or obtain a first process value from the first sensor 104 at a first time, and may further collect and/or obtain a second process value from the first sensor 104 at a second time that differs from the first time. In some examples, the first and second process values may correspond to data indicative of the pressure of a gas flowing through the compressor 102 as sensed and/or measured by the first sensor 104 at different times. In other examples, the first and second process values may correspond to data indicative of the velocity and/or flow rate of a gas flowing through the compressor 102 as sensed and/or measured by the first sensor 104 at different times. In some examples, the first transmitter 110 may collect and/or obtain additional process values from one or more sensor(s) in addition to the first sensor 104. For example, the first transmitter 110 may collect and/or obtain process values corresponding to data indicative of the pressure of a gas flowing through the compressor 102 as sensed and/or measured by the first sensor 104, and may further collect and/or obtain process values corresponding to data indicative of the velocity and/or flow rate of a gas flowing through the compressor 102 as sensed and/or measured by an additional sensor.

The first transmitter 110, via the filter 130, filters and/or removes noise and/or artifacts from the signal(s) and/or data that is collected and/or obtained from the first sensor 104. For example the filter 130 may be implemented as a first order filter. In some examples, the filter includes adjustable and/or selectable filter values. In some examples, the adjustable and/or selectable filter values include a filter value that corresponds to no filter being applied to the signal and/or data that is collected and/or obtained from the first sensor 104.

Based on a set of "N" collected process values, where "N" is an integer that is equal or greater than 2, the first transmitter 110, via the processor 126, calculates, computes and/or determines a derivative process value. For example, based on the collected first and second process values, the first transmitter 110, via the processor 126, calculates, computes and/or determines a derivative process value. In other examples, the derivative process value may be calculated, computed and/or determined based on a greater number of process values. As used herein, the term "derivative" means the rate of change of a variable and/or value over time. For example, the first transmitter 110 may calculate, compute and/or determine the derivative process value as the difference between the collected first and second process values, divided by the difference between the times at which the first and second process values were collected. In some examples, the first transmitter 110 may execute a proportional-integral-derivative (PID) algorithm. In such examples, the first transmitter 110 may determine the derivative process value based on the derivative portion of the output of the PID algorithm.

In some examples, the first transmitter 110 may collect and/or obtain process values from the first sensor 104 in addition to the first and second process values described above. In some such examples, the first transmitter 110 may calculate, compute and/or determine one or more derivative process values (e.g., a separate derivative process value) in addition to the derivative process value described above based on such additional collected and/or obtained process values. Derivative process values (e.g., the derivative process value and/or the additional derivative process value(s) described above) calculated, computed and/or determined by the first transmitter 110 may be stored in the memory 128. The first transmitter 110 provides the example controller 116 with access to the calculated, computed and/or determined derivative process values. In some examples, the first transmitter 110 may additionally provide the example controller 116 with access to the process values from which the first transmitter 110 calculated, computed and/or determined the derivative process values.

In the illustrated example of FIG. 1, the second and third transmitters 112, 114 are respectively operatively coupled to corresponding ones of the example second and third sensors 106, 108. The example second transmitter 112 includes an example processor 132, an example memory 134, and an example filter 136. The second transmitter 112 may be analog or digital, and may be configured to communicate via a Foundation Fieldbus communication protocol, via a HART communication protocol, via 4-20 mA wiring, and/or via any other industrial communication protocol. Data obtained from and/or provided by the second sensor 106 may be stored in the memory 134 of the second transmitter 112. The processor 132 of the second transmitter 112 may access such data from the memory 134, or may alternatively receive such data directly from the second sensor 106.

Similarly, the example third transmitter 114 includes an example processor 138, an example memory 140, and an example filter 142. The third transmitter 114 may be analog or digital, and may be configured to communicate via a Foundation Fieldbus communication protocol, via a HART communication protocol, via 4-20 mA wiring, and/or via any other industrial communication protocol. Data obtained from and/or provided by the third sensor 108 may be stored in the memory 140 of the third transmitter 114. The processor 138 of the third transmitter 114 may access such data from the memory 140, or may alternatively receive such data directly from the third sensor 108.

The memory 134 and/or the memory 140 may be implemented by any type(s) and/or any number(s) of volatile memory, non-volatile memory, a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which data is stored for any duration (e.g., for extended time periods, permanently, brief instances, for temporarily buffering, and/or for caching of the data). The data stored in the memory 134 and/or the memory 140 may be stored in any file and/or data structure format, organization scheme, and/or arrangement.

Each of the example second and third transmitters 112, 114, via its respective processor 132, 138, collects and/or obtains one or more process values from corresponding ones of the example second and third sensors 106, 108. For example, the second transmitter 112 may collect and/or obtain a third process value from the second sensor 106 at a third time, and may further collect and/or obtain a fourth process value from the second sensor 106 at a fourth time that differs from the third time. Similarly, the third transmitter 114 may collect and/or obtain a fifth process value from the third sensor 108 at a fifth time, and may further collect and/or obtain a sixth process value from the third sensor 108 at a sixth time that differs from the fifth time.

In some examples, the third and fourth times at which the second transmitter 114 collects and/or obtains the third and fourth process values from the second sensor 106 may respectively correspond to the first and second times at which the first transmitter 110 collects and/or obtains the first and second process values from the first sensor 104. Similarly, in some examples, the fifth and sixth times at which the third transmitter 114 collects and/or obtains the fifth and sixth process values from the third sensor 108 may respectively correspond to the first and second times at which the first transmitter 110 collects and/or obtains the first and second process values from the first sensor 104. In other examples, there may be no correlation between and/or among the example first and second times at which the first transmitter 110 collects and/or obtains the first and second process values, the example third and fourth times at which the second transmitter 112 collects and/or obtains the third and fourth process values, and/or the example fifth and sixth times at which the third transmitter 114 collects and/or obtains the fifth and sixth process values.

Each of the example second and third transmitters 112, 114, via its respective filter 136, 142, filters and/or removes noise and/or artifacts from the respective signals and/or data collected and/or obtained from the corresponding ones of the second and third sensors 106, 108. In some examples, the second and/or third filters 136, 142 may be implemented using a type of filter that is the same as the type of filter used to implement the first filter 130, as described above. In other examples, one or more of the second and/or third filters 136, 142 may be implemented using a type of filter that is/are different from the type of filter used to implement the first filter 130. In other examples, one or more of the example first, second or third transmitters 110, 112, 114 may be implemented to operate without a corresponding filter 130, 136, 142, and/or may be implemented to operate with a corresponding filter 130, 136, 142 disabled or turned off.

Based on the collected third and fourth process values, the second transmitter 112, via the processor 132, calculates, computes and/or determines a second additional derivative process value. For example, the second transmitter 112 may calculate, compute and/or determine the second additional derivative process value as the difference between the collected third and fourth process values divided by the difference between the times at which the third and fourth process values were collected. In some examples, the second transmitter 112 may execute a PID algorithm. In such examples, the second transmitter 112 may determine the second additional derivative process value based on the derivative portion of the output of the PID algorithm.

Similarly, based on the collected fifth and sixth process values, the third transmitter 114, via the processor 138, calculates, computes and/or determines a third additional derivative process value. For example, the third transmitter 114 may calculate, compute and/or determine the third additional derivative process value as the difference between the collected fifth and sixth process values divided by the difference between the times at which the fifth and sixth process values were collected. In some examples, the third transmitter 114 may execute a PID algorithm. In such examples, the third transmitter 114 may determine the third additional derivative process value based on the derivative portion of the output of the PID algorithm.

In some examples, one or both of the second and/or third transmitters 112, 114 may respectively collect and/or obtain process values from corresponding ones of the second and/or third sensors 106, 108 in addition to the example third, fourth, fifth and sixth process values described above. In some such examples, the second and/or third transmitters 112, 114 may respectively calculate, compute and/or determine one or more derivative process values in addition to the example second and third additional derivative process values described above based on such additional collected and/or obtained process values. Derivative process values (e.g., the second additional derivative process value described above) calculated, computed and/or determined by the second transmitter 112 may be stored in the memory 134, while derivative process values (e.g., the third additional derivative process value described above) calculated, computed and/or determined by the third transmitter 114 may be stored in the memory 140. The second and third transmitters 112, 114 respectively provide the example controller 116 with access to the calculated, computed and/or determined derivative process values. In some examples, the second and third transmitters 112, 114 may additionally provide the example controller 116 with access to the process values from which the second and third transmitters 112, 114 respectively calculated, computed and/or determined the derivative process values.

While the example surge detection apparatus 100 illustrated in FIG. 1 includes three transmitters (e.g., the example first, second and third transmitters 110, 112, 114), the surge detection apparatus 100 may include any number of transmitters, including without limitation only a single transmitter (e.g., the example first transmitter 110). Furthermore, while the number of transmitters (e.g., the example first, second and third transmitters 110, 112, 114) included within the example surge detection apparatus 100 illustrated in FIG. 1 corresponds to the number of sensors (e.g., the example first, second and third sensors 104, 106, 108) included in the surge detection apparatus 100, the number of transmitters included in the surge detection apparatus 100 may, in some examples, differ from the number of sensors included in the surge detection apparatus 100. For example, two or more of the example first, second or third transmitters 110, 112, 114 may be implemented to operate with a single corresponding sensor. In other examples, two or more of the example first, second or third sensors 104, 106, 108 may be implemented to operate with a single corresponding transmitter, or with more than one corresponding transmitter.

While the example surge detection apparatus 100 of FIG. 1 illustrates the example first, second and third transmitters 110, 112, 114 and the example first, second and third sensors 104, 106, 108 as separate components, respective ones of the first, second and third sensors 104, 106, 108 may be integrated with and/or included within corresponding respective ones of the first, second and third transmitters, 110, 112, 114. For example, the first transmitter 110 may include the first sensor 104, the second transmitter 112 may include the second sensor 106, and the third transmitter 114 may include the third sensor 108.

In the illustrated example of FIG. 1, the controller 116 is operatively coupled to respective ones of the first, second and third transmitters 110, 112, 114. The controller 116 includes an example processor 144 and example memory 146. Data obtained from and/or provided by the first, second and/or third transmitters 110, 112, 114 may be stored in the memory 146. The processor 144 may access such data from the memory 146, or may alternatively receive such data directly from the first, second and/or third transmitters 110, 112, 114. The memory 146 may be implemented by any type(s) and/or any number(s) of volatile memory, non-volatile memory, a storage drive, a storage disk, a flash memory, a read-only memory (ROM), a random-access memory (RAM), a hard disk drive, a compact disk (CD), a digital versatile disk (DVD), a Blu-ray disc, a cache and/or any other storage medium in which data is stored for any duration (e.g., for extended time periods, permanently, brief instances, for temporarily buffering, and/or for caching of the data). The data stored in the memory 146 may be stored in any file and/or data structure format, organization scheme, and/or arrangement.

The controller 116 obtains, accesses and/or receives the derivative process values described above as calculated, computed and/or determined by respective ones of the first, second and/or third transmitters 110, 112, 114. For example, the controller 116 may obtain the example first derivative process value from the first transmitter 110, the example second additional derivative process value from the second transmitter 112, and/or the third additional derivative process value from the third transmitter 114. The controller 116 compares one or more of the obtained derivative process value(s) to one or more threshold value(s). In some examples, the threshold value(s) is/are indicative of the initiation of a surge event in the compressor 102.

In some examples, the threshold value is a minimum threshold value. In such examples, a derivative process value satisfies the threshold value when the derivative process value is greater than the threshold value. In other examples, the threshold value is a maximum threshold value. In such other examples, a derivative process value satisfies the threshold value when the derivative process value is less than the threshold value. In other examples, the threshold values include both a minimum threshold value and a maximum threshold value that together define a range of acceptable derivative process values. In such other examples, a derivative process value satisfies the threshold values when the derivative process value is within the range of acceptable derivative process values.

In response to determining that a derivative process value fails to satisfy the threshold value(s), the controller 116 actuates the example valve 118 of FIG. 1 to prevent surge and/or to enable a subsequent derivative process value of the compressor 102 determined by the corresponding transmitter to satisfy the threshold value(s). For example, in response to determining that the example first derivative process value determined by the first transmitter 110 at a first time fails to satisfy the threshold value(s), the controller 116 actuates the valve 118 to prevent surge and/or to enable the example additional derivative process value determined by the first transmitter 110 at a second time subsequent to the first time to satisfy the threshold value(s).

In some examples, the controller 116 actuates the valve 118 based on one or more control signal(s) and/or instruction(s) transmitted from the controller 116 to the valve 118. In some examples, such control signal(s) and/or instructions determine the extent to which the valve 118 is to be opened and/or closed. In some examples, such control signal(s) and/or instruction(s) are based on a surge detection algorithm that uses the derivative process value failing to satisfy the threshold value(s) as an input to determine the extent to which the valve is to be opened and/or closed. In some examples, the controller 116 additionally and/or alternatively uses the derivative process value as an input to a closed-loop anti-surge algorithm that is separate from the surge detection algorithm. In some examples, the closed-loop anti-surge algorithm generates one or more control signal(s) and/or instruction(s) to determine the extent to which the valve 118 is to be opened and/or closed. In some examples, the surge detection algorithm operates at a rate that exceeds (i.e., is faster than) a rate of operation of the closed-loop anti-surge algorithm.

In some examples, prior to actuating the valve 118 in response to determining that a derivative process value obtained from a transmitter 110, 112, 114 fails to satisfy the threshold value(s), the controller 116 compares the derivative process value obtained from the transmitter 110, 112, 114 to one or more other derivative process values obtained from one or more other transmitters 110, 112, 114. Such a comparison facilitates determining whether the derivative process value failing to satisfy the threshold value(s) is reliable, and/or whether the derivative process value failing to satisfy the threshold value(s) was determined by a transmitter 110, 112, 114 based on data obtained from a properly-functioning sensor 104, 106, 108.

For example, the controller 116 may compare the example first derivative process value to one or both of the example second and/or third additional derivative process values. Based on the comparison, the controller 116 determines the reliability of one or more of the example first derivative, second additional derivative and/or third additional derivative process values determined by respective ones of the first, second and/or third transmitter(s) 110, 112, 114. The controller 116 may also determine a functional status of one or more of the example first, second and/or third sensor(s) 104, 106, 108 corresponding to respective ones of the first, second and/or third transmitter(s) 110, 112, 114.

If the controller 116 determines that a derivative process value failing to satisfy the threshold value(s) is unreliable and/or was determined by a transmitter based on data obtained from a sensor that is not functioning properly, the controller 116 may determine not to actuate the valve 118 even though the derivative process value fails to satisfy the threshold value(s). Thus, determining the reliability of the derivative process value and/or the functional status of the sensor corresponding to the transmitter that determined the derivative process value provides the controller 116 with the ability to verify that the derivative process value is reliable, and to avoid actuating the valve 118 when the derivative process value is unreliable and/or when the derivative process value is a false-positive.

As one example, if the controller 116 determines that the example first derivative, second additional derivative and third additional derivative process values substantially match one another, the controller 116 determines that each of the example first derivative, second additional derivative and third additional derivative process values is reliable. As used herein, the example first derivative, second additional derivative and third additional derivative process values substantially match one another when there is not a significant statistical difference and/or deviation between the example first derivative, second additional derivative and third additional derivative process values. In such an example, the controller 116 may further determine that each of the first, second and third sensors 104, 106, 108 corresponding to respective ones of the first, second and third transmitters 110, 112, 114 is functioning properly. In such an example, based on the determination that the example first derivative process value is reliable and/or that the first sensor 104 corresponding to the first transmitter 110 is functioning properly, the controller 116 may proceed with actuating the valve 118.

As another example, if the controller 116 determines that the example second and third additional derivative process values substantially match one another but that the example first derivative process value fails to substantially match either of the example second or third additional derivative process values, the controller 116 determines that the example second and third additional derivative process values are reliable and further determines that the example first derivative process value is unreliable. As used herein, the example second and third additional derivative process values substantially match one another when there is not a significant statistical difference and/or deviation between the example second and third additional derivative process values. As used herein, the first derivative process value fails to substantially match either of the example second or third additional derivative process values when a significant statistical difference and/or deviation exists between the example first derivative process value and the example second additional derivative process value, and/or between the example first derivative process value and the example third additional derivative process value. In such an example, the controller 116 may further determine that the second and third sensors 106, 108 corresponding to respective ones of the second and third transmitters 112, 114 are functioning properly, and that the first sensor 104 corresponding to the first transmitter 110 is not functioning properly. In such an example, based on the determination that the example first derivative process value is unreliable and/or that the first sensor 104 corresponding to the first transmitter 110 is not functioning properly, the controller 116 may determine not to actuate the valve 118 even if the example first derivative process value failed to satisfy the threshold value(s).

In some examples, the controller 116 implements a majority voting scheme to determine the reliability of one or more of the derivative process value(s) and/or to determine the functional status of one or more of the first, second and/or third sensor(s) 104, 106, 108 corresponding to respective ones of the first, second and/or third transmitter(s) 110, 112, 114. For example, if the controller 116 determines that a majority (e.g., two out of three) of the example first derivative, second additional derivative and third additional derivative process values substantially match one another, the controller 116 may determine that the two derivative process values forming the majority are reliable, while the single derivative process value which does not form the majority is unreliable. As used herein, a majority (e.g., two out of three) of the example first derivative, second additional derivative and third additional derivative process values substantially match one another when there is not a significant statistical difference and/or deviation between the majority. In such an example, the controller 116 may further determine that respective ones of the sensors corresponding to respective ones of the transmitters that determined the derivative process values corresponding to the majority are functioning properly, while respective ones of the sensors corresponding to respective ones of the transmitters that determined derivative process values not corresponding to the majority are not functioning properly. In other examples, the implemented voting scheme may disregard derivative process values that have been determined to be unreliable, and may make a further reliability determination based on the derivative process values that have not been disregarded, and/or based on an average thereof.

In some examples, the controller 116 may be able to determine whether the derivative process value failing to satisfy the threshold value(s) is reliable without comparing the example first derivative, second additional derivative and third additional derivative process values. For example, the controller 116 may obtain diagnostics from one or more of the first, second and/or third transmitter(s) 110, 112, 114 that may inform the controller 116 as to the reliability of signals and/or data obtained by the controller 116 from the respective ones of the first, second and/or third transmitter(s) 110, 112, 114.

In some examples, the controller 116 may generate one or more notification(s) and/or message(s) identifying the determined reliability of one or more of the derivative process value(s) and/or identifying the determined functional status of one or more of the first, second and/or third sensor(s) 104, 106, 108 corresponding to respective ones of the first, second and/or third transmitter(s) 110, 112, 114. For example, if the controller 116 determines that each of the example first derivative, second additional derivative and third additional derivative process values is reliable and/or determines that each of the first, second and third sensors 104, 106, 108 is functioning properly, the controller 116 may generate one or more notification(s) and/or message(s) indicating that one or more of the example first derivative, second additional derivative and/or third additional derivative process value(s) is/are reliable, and/or that one or more of the first, second and/or third sensor(s) 104, 106, 108 is functioning properly. As another example, if the controller 116 determines that the example first derivative process value is unreliable and that the example second and third additional derivative process values are reliable, and/or determines that the first sensor 104 is not functioning properly and that the second and third sensors 106, 108 are functioning properly, the controller 116 may generate one or more notification(s) and/or message(s) indicating that the example first derivative process value is unreliable, that the example second and/or third additional derivative process value(s) are reliable, that the first sensor 104 is not functioning properly, and/or that the second and/or third sensor(s) 106, 108 are functioning properly.

In the illustrated example of FIG. 1, the valve 118 is operatively coupled to the controller 116 and the compressor 102. As described above, the controller 116 determines a position of the valve 118 such as, for example, the degree and/or extent to which the valve 118 is to be opened or closed. As the degree and/or extent to which the valve 118 is opened increases, the amount of gas flowing from the compressor 102 into the valve 118 also increases, thereby resulting in a relative decrease in the pressure of the gas near the outlet 122 of the compressor 102 and a relative increase in the flow of gas across the rotor 124 of the compressor 102. Increasing the flow of gas across the rotor 124 of the compressor 102 may eliminate and/or reverse a surge event occurring within the compressor 102, such that the compressor 102 is no longer operating in a state of surge.

In some examples, the valve 118 is a recycle valve. In such examples, gas flowing into the valve 118 from the compressor 102 is returned to the inlet 120 of the compressor 102 via an example pathway 148 as illustrated in FIG. 1. The example pathway 148 may be implemented as a conduit such as, for example, a pipe or tube. In other examples, the valve 118 is a blow-off valve. In such other examples, gas flowing into the valve 118 from the compressor 102 is vented to the atmosphere via the example pathway 150 illustrated in FIG. 1.

While an example manner of implementing the example surge detection apparatus 100 is illustrated in FIG. 1, one or more of the elements, processes and/or devices illustrated in FIG. 1 may be combined, divided, re-arranged, omitted, eliminated and/or implemented in any other way. Further, the example first, second and third sensors 104, 106, 108, the example first, second and third transmitters 110, 112, 114 and/or the example controller 116 of FIG. 1 may be implemented by hardware, software, firmware and/or any combination of hardware, software and/or firmware. Thus, for example, any of the example first, second and third sensors 104, 106, 108, the example first, second and third transmitters 110, 112, 114 and/or the example controller 116 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example first, second and third sensors 104, 106, 108, the example first, second and third transmitters 110, 112, 114 and/or the example controller 116 is/are hereby expressly defined to include a tangible computer readable storage device or storage disk such as a memory, a digital versatile disk (DVD), a compact disk (CD), a Blu-ray disk, etc. storing the software and/or firmware. Further still, the example surge detection apparatus 100 of FIG. 1 may include one or more element(s), process(es) and/or device(s) in addition to, or instead of, those illustrated in FIG. 1, and/or may include more than one of any or all of the illustrated elements, processes and devices.

Figure 2:
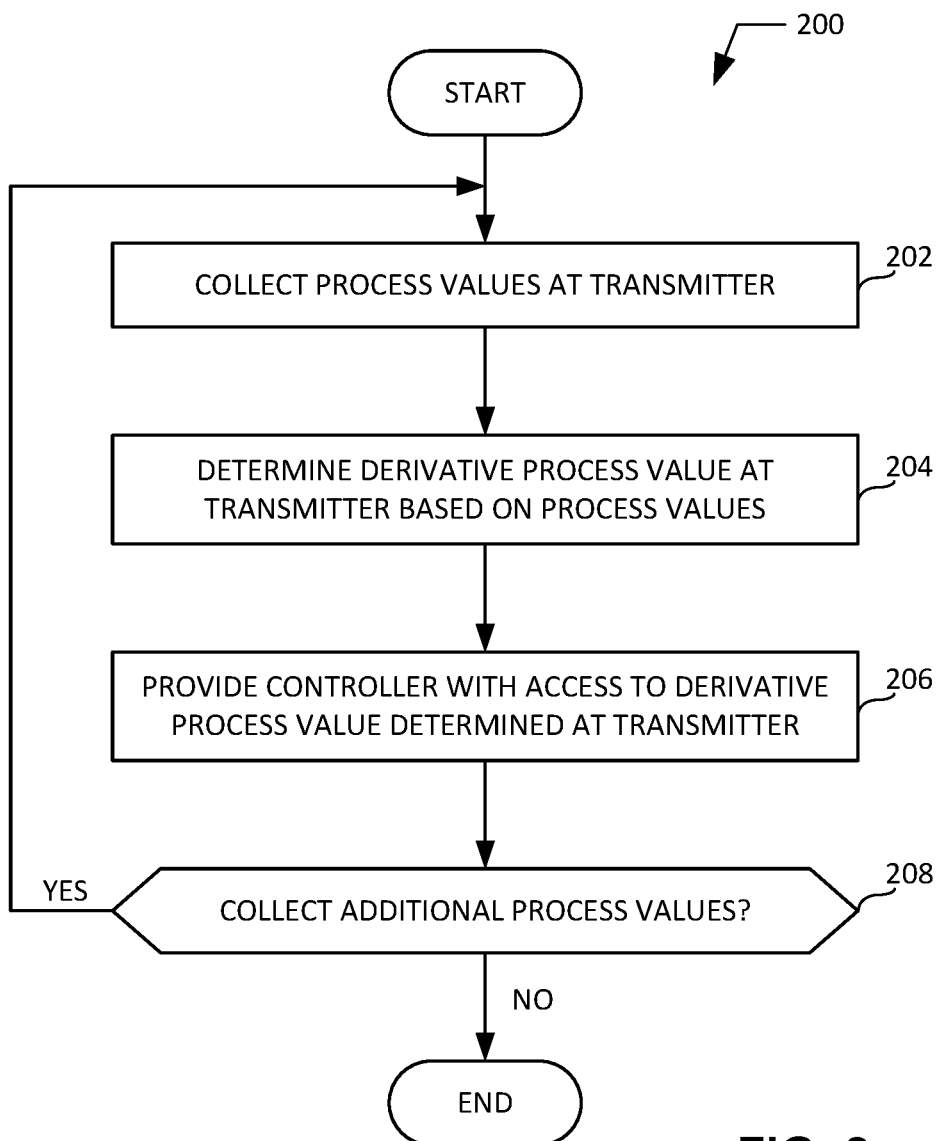
FIG. 2 is a flowchart representative of an example method that may be executed at any of the example first, second and/or third transmitters of FIG. 1 to determine one or more derivative process value(s) of the example compressor of FIG. 1.
Figure 3:
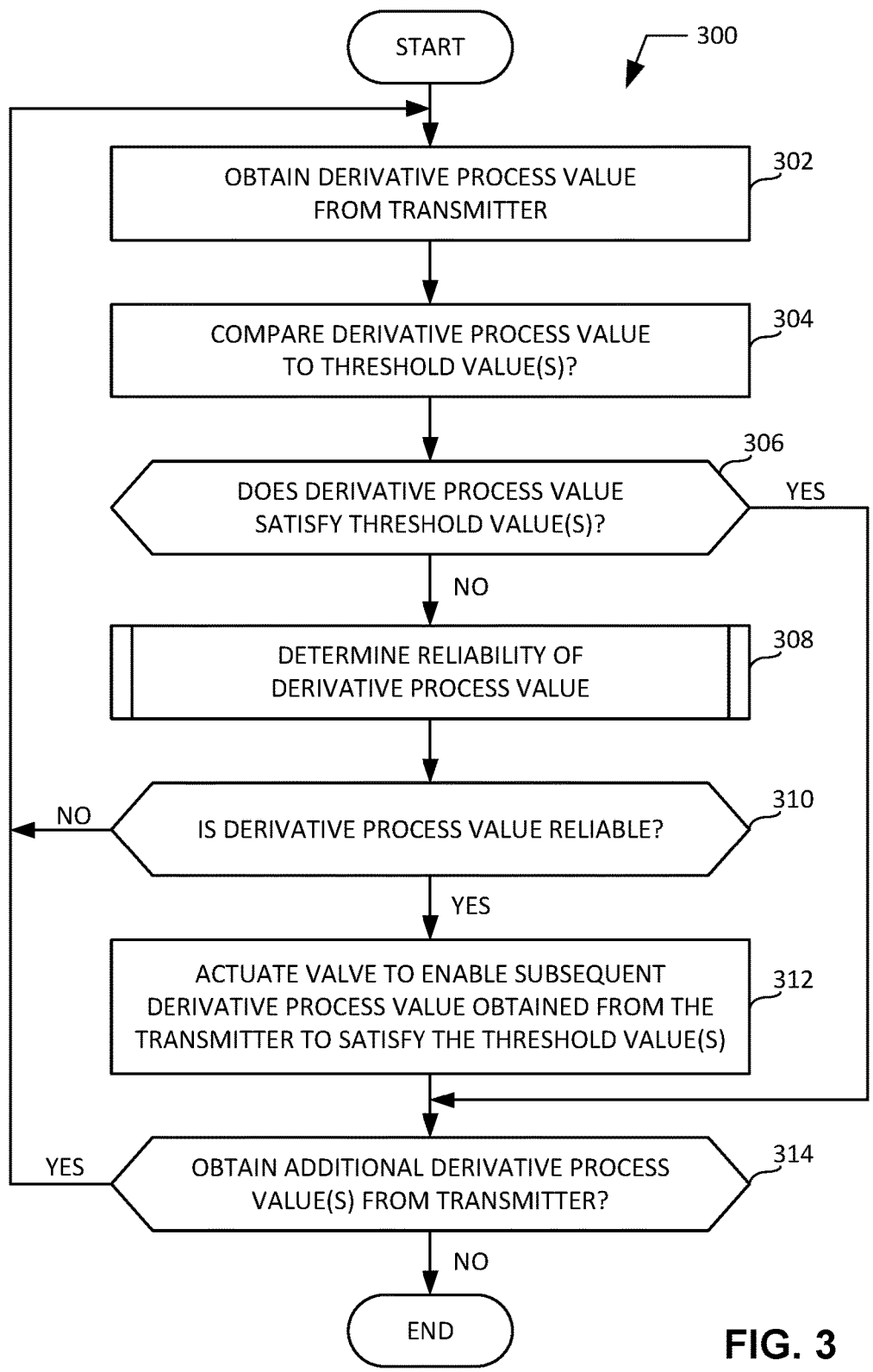
FIG. 3 is a flowchart representative of an example method that may be executed at the example controller of FIG. 1 to detect the initiation of a surge event in the example compressor of FIG. 1.
Figure 4:
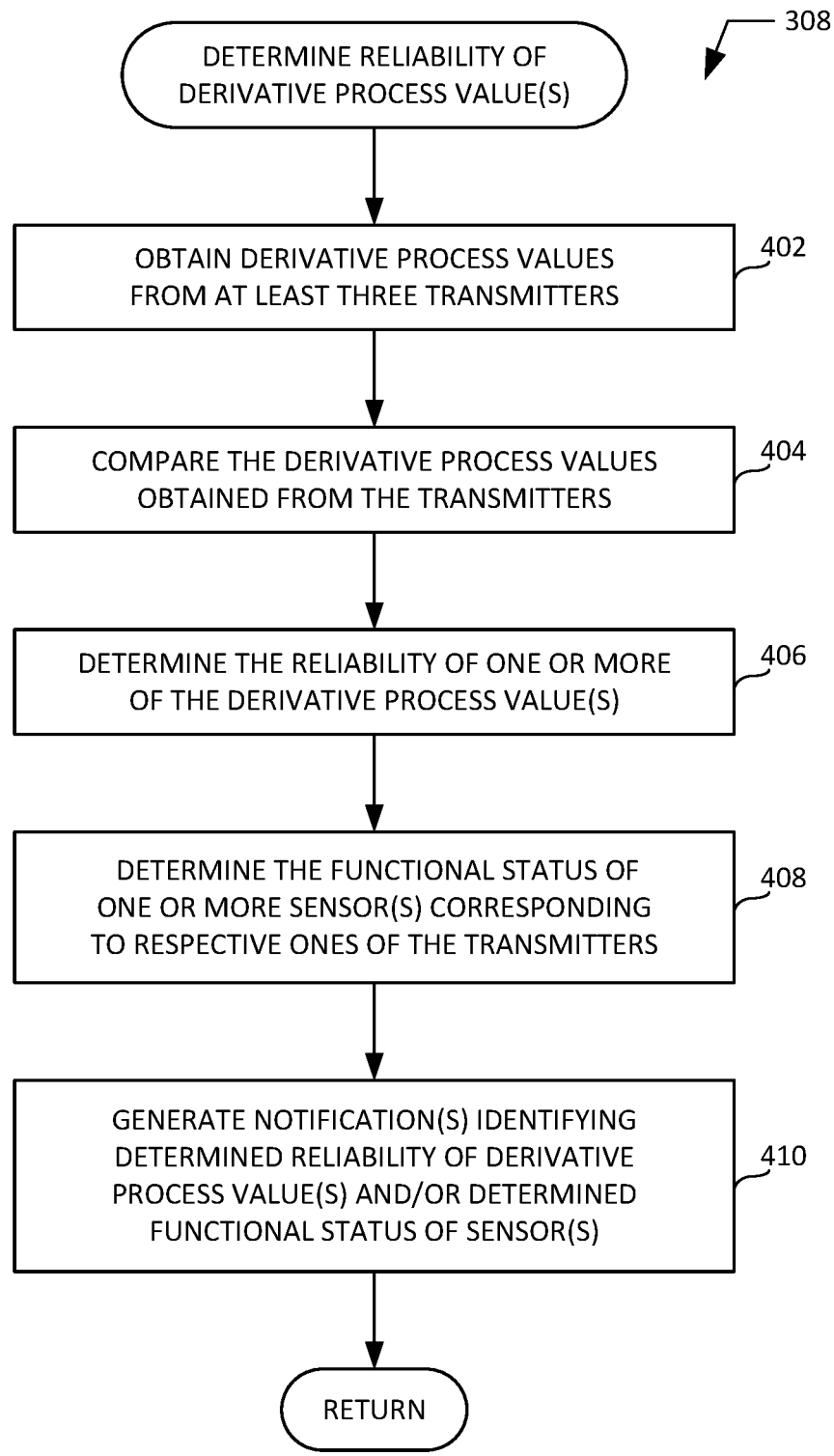
FIG. 4 is a flowchart representative of an example method that may be executed at the example controller of FIG. 1 to determine whether one or more derivative process value(s) determined by one or more of the example first, second and/or third transmitter(s) of FIG. 1 is/are reliable.

Flowcharts representative of example methods for detecting the initiation of a surge event in the example compressor 102 of FIG. 1 are shown in FIGS. 2, 3 and 4. In these examples, the methods may be implemented using machine-readable instructions that comprise one or more program(s) for execution by a processor such as the processor 512 shown in the example processor platform 500 discussed below in connection with FIG. 5, or the processor 612 shown in the example processor platform 600 discussed below in connection with FIG. 6. The one or more program(s) may be embodied in software stored on a tangible computer readable storage medium such as a CD-ROM, a floppy disk, a hard drive, a digital versatile disk (DVD), a Blu-ray disk, or a memory associated with the processor 512 or the processor 612, but the entire program(s) and/or parts thereof could alternatively be executed by a device other than the processor 512 or the processor 612 and/or embodied in firmware or dedicated hardware. Further, although the example program(s) is/are described with reference to the flowcharts illustrated in FIGS. 2, 3 and 4, many other methods for detecting the initiation of a surge event in the example compressor 102 of FIG. 1 may alternatively be used. For example, the order of execution of the blocks may be changed, and/or some of the blocks described may be changed, eliminated, or combined.

As mentioned above, the example methods of FIGS. 2, 3 and 4 may be implemented using coded instructions (e.g., computer and/or machine-readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term "tangible computer readable storage medium" is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 2, 3 and 4 may be implemented using coded instructions (e.g., computer and/or machine-readable instructions) stored on a non-transitory computer and/or machine-readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term "non-transitory computer readable medium" is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 2 is a flowchart representative of an example method that may be executed at any of the example first, second and/or third transmitters 110, 112, 114 of FIG. 1 to determine one or more derivative process value(s) of the example compressor 102 of FIG. 1. Thus, while the example method of FIG. 2 is primarily described below in connection with the first transmitter 110 and the first sensor 104 of FIG. 1, such description is equally applicable to the second transmitter 112 and the second sensor 106 of FIG. 1, and/or to the third transmitter 114 and the third sensor 108 of FIG. 1.

The example method 200 of FIG. 2 begins when the transmitter (e.g., the first transmitter 110 of FIG. 1) collects and/or obtains process values (block 202). For example, the first transmitter 110 may collect and/or obtain a first process value from the first sensor 104 of FIG. 1 at a first time, and may further collect and/or obtain a second process value from the first sensor 104 of FIG. 1 at a second time that differs from the first time. In some examples, the first and second process values may correspond to data indicative of the pressure of a gas flowing through the compressor 102 of FIG. 1 as sensed and/or measured by the first sensor 104 at different times. In other examples, the first and second process values may correspond to data indicative of the velocity and/or flow rate of a gas flowing through the compressor 102 as sensed and/or measured by the first sensor 104 at different times.

Based on the collected process values, the transmitter (e.g., the first transmitter 110 of FIG. 1) calculates, computes and/or determines a derivative process value (block 204). For example, the first transmitter 110 may calculate, compute and/or determine a derivative process value as the difference between the collected first and second process values, divided by the difference between the times at which the first and second process values were collected.

The transmitter (e.g., the first transmitter 110 of FIG. 1) provides the controller 116 of FIG. 1 with access to the derivative process value determined by the transmitter (block 206). For example, the first transmitter 110 enables the controller 116 to obtain, access, retrieve and/or receive the example first derivative process value determined by the first transmitter 110.

The transmitter (e.g., the first transmitter 110 of FIG. 1) determines whether to collect and/or obtain additional process values (block 208). For example, the first transmitter 110 may determine that process values in addition to the first and second process values described above should be collected and/or obtained from the first sensor 104. If the first transmitter 110 determines at block 208 that additional process values should be collected and/or obtained, control of the example method 200 returns to block 202. If the first transmitter 110 instead determines at block 208 that additional process values should not be obtained, the example method 200 ends.

FIG. 3 is a flowchart representative of an example method that may be executed at the example controller 116 of FIG. 1 to detect the initiation of a surge event in the example compressor 102 of FIG. 1. While the example method of FIG. 3 is primarily described below in connection with the controller 116 obtaining and utilizing the example first derivative process value determined by the first transmitter 110 of FIG. 1, such description is equally applicable to the controller 116 obtaining and utilizing the example second additional derivative process value determined by the second transmitter 112 of FIG. 1, and/or to the controller 116 obtaining and utilizing the example third additional derivative process value determined by the third transmitter 114 of FIG. 1.

The example method 300) of FIG. 3 begins when the controller 116 of FIG. 1 obtains, accesses, retrieves and/or receives a derivative process value from a transmitter (block 302). For example, the controller 116 may obtain, access, retrieve and/or receive the example first derivative process value described above from the first transmitter 110 of FIG. 1.

The controller 116 of FIG. 1 compares the obtained derivative process value to one or more threshold value(s) (block 304). For example, the controller 116 may compare the example first derivative process value described above to the one or more threshold value(s). In some examples, the threshold value(s) is/are indicative of the initiation of a surge event in the compressor 102 of FIG. 1. In some examples, the threshold value is a minimum threshold value. In other examples, the threshold value is a maximum threshold value. In other examples, the threshold values include both a minimum threshold value and a maximum threshold value that together define a range of acceptable derivative process values.

Based on the comparison that occurs at block 304, the controller 116 of FIG. 1 determines whether the derivative process value satisfies the threshold value(s) (block 306). For example, the controller 116 may determine that the example first derivative process value described above fails to satisfy the threshold value(s) and/or the range of acceptable derivative process values defined by the threshold values. In some examples, a failure to satisfy the threshold value(s) is indicative of the initiation of a surge event in the compressor 102. If the controller 116 determines at block 306 that the derivative process value fails to satisfy the threshold value(s), control of the example method 300 proceeds to block 308. If the controller 116 instead determines at block 306 that the derivative process value satisfies the threshold value(s), control of the example method proceeds to block 314.

At block 308, the controller 116 of FIG. 1 determines the reliability of the derivative process value (block 308). For example, the controller 116 may determine the reliability of the example first derivative process value described above. An example process that may be used to implement block 308 is described in greater detail below in connection with FIG. 4 in which the controller 116 determines the reliability of the derivative process value by comparing the derivative process value to other derivative process values obtained from other transmitters. In some examples, the controller 116 may be able to determine the reliability of the derivative process value at block 308 without comparing the derivative process value to other derivative process values obtained from other transmitters. For example, the controller 116 may obtain diagnostics from the first transmitter 110 that may inform the controller 116 as to the reliability of signals and/or data obtained by the controller 116 from the first transmitter 110. In such an example, block 308 may be implemented by the controller 116 to determine the reliability a derivative process value obtained from the first transmitter 110 by evaluating the diagnostic data obtained from the first transmitter 110, and without comparing the derivative process value to other derivative process values obtained from the second and/or third transmitter(s) 112, 114. Following block 308, control of the example method 300 proceeds to block 310.

At block 310, based on the determination that occurs at block 308, the controller 116 of FIG. 1 determines whether the derivative process value is reliable (block 310). For example, the controller 116 may determine that the reliability of the example first derivative process value described above, as determined at block 308, is indicative of the example first derivative process value being reliable. If the controller 116 determines at block 310 that the derivative process value is reliable, control of the example method 300 proceeds to block 312. If the controller 116 instead determines at block 310 that the derivative process value is unreliable, control of the example method 300 returns to block 302.

At block 312, in response to determining at block 306 that the derivative process value fails to satisfy the threshold value(s), and/or in response to determining at block 310 that the derivative process value failing to satisfy the threshold value(s) is a reliable derivative process value, the controller 116 of FIG. 1 actuates the valve 118 of FIG. 1 to prevent surge and/or to enable a subsequent derivative process value determined by the transmitter to satisfy the threshold value(s) (block 312). For example, in response to determining that the example first derivative process value determined by the first transmitter 110 at a first time fails to satisfy the threshold value(s), the controller 116 may actuate the valve 118 to a position that prevents surge and/or enables an example additional derivative process value determined by the first transmitter 110 at a second time subsequent to the first time to satisfy the threshold value(s). In some examples, the controller 116 actuates the valve 118 based on one or more control signal(s) and/or instruction(s) transmitted from the controller 116 to the valve 118. In some examples, such control signal(s) and/or instructions determine the extent to which the valve 118 is to be opened and/or closed. In some examples, such control signal(s) and/or instruction(s) are based on a surge detection algorithm that uses the derivative process value failing to satisfy the threshold value(s) as an input to determine the extent to which the valve is to be opened and/or closed. In some examples, the controller 116 additionally uses the derivative process value as an input to a closed-loop anti-surge algorithm that is separate from the surge detection algorithm. In some examples, the closed-loop anti-surge algorithm generates one or more control signal(s) and/or instruction(s) to determine the extent to which the valve 118 is to be opened and/or closed. In some examples, the surge detection algorithm operates at a rate that exceeds (i.e., is faster than) a rate of operation of the closed-loop anti-surge algorithm. Following block 312, control of the example method 300 proceeds to block 314.

At block 314, the controller 116 of FIG. 1 determines whether one or more additional derivative process values should be obtained, accessed, retrieved and/or received from the transmitter (block 314). For example, the controller 116 may determine that the example additional derivative process value described above should be obtained, accessed, retrieved and/or received from the first transmitter 110. If the controller 116 determines at block 314 that one or more additional derivative process values should be obtained, accessed, retrieved and/or received from the transmitter, control of the example method 300 of FIG. 3 returns to block 302. If the controller 116 instead determines at block 314 that additional derivative process values should not be obtained, accessed, retrieved and/or received from the transmitter, the example method 300 ends.

FIG. 4 is a flowchart representative of an example method that may be executed at the example controller 116 of FIG. 1 to determine whether one or more derivative process value(s) determined by one or more of the example first, second and/or third transmitter(s) 110, 112, 114 of FIG. 1 is/are reliable. Example operations of blocks 402, 404, 406, 408 and 410 of FIG. 4 may be used to implement block 308 of FIG. 3.

The example method 308 of FIG. 4 begins when the controller 116 of FIG. 1 obtains, accesses, retrieves and/or receives derivative process values from at least three separate transmitters (block 402). For example, the controller 116 may obtain, access, retrieve and/or receive the example first derivative process value described above from the first transmitter 110 of FIG. 1, the example second additional derivative process value described above from the second transmitter 112 of FIG. 1, and the example third additional derivative process value described above from the third transmitter 114 of FIG. 1.

The controller 116 of FIG. 1 compares the derivative process values obtained from the at least three transmitters (block 404). For example, the controller 116 may compare the example first derivative process value obtained from the first transmitter 110 of FIG. 1 with the example second additional derivative process value obtained from the second transmitter 112 of FIG. 1, and/or with the example third additional derivative process value obtained from the third transmitter 114 of FIG. 1.

Based on the comparison that occurs at block 404, the controller 116 of FIG. 1 determines the reliability of one or more of the derivative process value(s) determined by the at least three transmitters (block 406). For example, the controller 116 may determine the reliability of one or more of the example first derivative, second additional derivative and/or third additional derivative process value(s) determined by respective ones of the first, second and third transmitters 110, 112, 114 of FIG. 1.

As one example of the determination that may occur at block 406, if the controller 116 determines that the example first derivative, second additional derivative and third additional derivative process values substantially match one another (e.g., such that a significant statistical difference and/or deviation fails to exist between the example first derivative, second additional derivative and third additional derivative process values), the controller 116 determines that each of the example first derivative, second additional derivative and third additional derivative process values is reliable.

As another example of the determination that may occur at block 406, if the controller 116 determines that the example second and third additional derivative process values substantially match one another (e.g., such that a significant statistical difference and/or deviation fails to exist between the example second and third additional derivative process values) but that the example first derivative process value fails to substantially match either of the example second or third additional derivative process values (e.g., such that a significant statistical difference and/or deviation exists between the example first derivative process value and the example second additional derivative process value, and/or between the example first derivative process value and the example third additional derivative process value), the controller 116 determines that the example second and third additional derivative process values are reliable and further determines that the example first derivative process value is unreliable.

As another example of the determination that may occur at block 406, the controller 116 may implement a majority voting scheme to determine the reliability of one or more of the derivative process value(s) determined by respective ones of the at least three transmitters. For example, if the controller 116 determines that a majority (e.g., two out of three) of the example first derivative, second additional derivative and third additional derivative process values substantially match one another (e.g., such that a significant statistical difference and/or deviation fails to exist between the majority), the controller 116 may determine that the two derivative process values forming the majority are reliable, while the single derivative process value which does not form the majority is unreliable.

Based on the comparison that occurs at block 404 and/or the determination that occurs at block 406, the controller 116 of FIG. 1 determines a functional status of one or more sensor(s) corresponding to respective ones of the at least three transmitters (block 408). For example, the controller 116 may determine a functional status of one or more of the example first, second and/or third sensors 104, 106, 108 of FIG. 1 corresponding to respective ones of the first, second and third transmitters 110, 112, 114 of FIG. 1.

As one example of the determination that may occur at block 408, if the controller 116 determines at block 406 that each of the example first derivative, second additional derivative and third additional derivative process values is reliable, the controller 116 may further determine that each of the first, second and third sensors 104, 106, 108 is functioning properly.

As another example of the determination that may occur at block 408, if the controller 116 determines at block 406 that the example second and third additional derivative process values are reliable but that the example first derivative process value is unreliable, the controller 116 may further determine that the second and third sensors 106, 108 are functioning properly and that the first sensor 104 is not functioning properly.

As another example of the determination that may occur at clock 408, if the controller 116 implements a majority voting scheme with respect to the derivative process values at block 406, the controller 116 may determine that respective ones of the first, second and third sensors 104, 106, 108 corresponding to the majority derivative process values are functioning properly, and that any one of the first, second or third sensors 104, 106, 108 not corresponding to the majority derivative process values is not functioning properly.

Based on the determination that occurs at block 406 and/or the determination that occurs at block 408, the controller 116 of FIG. 1 generates one or more notification(s) and/or message(s) identifying the determined reliability of one or more of the derivative process value(s) and/or identifying the determined functional status of one or more of the sensors corresponding to respective ones of the at least three transmitters. For example, if the controller 116 determines at block 406 that each of the example first derivative, second additional derivative and third additional derivative process values is reliable and/or determines at block 408 that each of the first, second and third sensors 104, 106, 108 is functioning properly, the controller 116 may generate one or more notification(s) and/or message(s) indicating that one or more of the example first derivative, second additional derivative and/or third additional derivative process value(s) is/are reliable, and/or that one or more of the first, second and/or third sensor(s) 104, 106, 108 is functioning properly. As another example, if the controller 116 determines at block 406 that the example first derivative process value is unreliable and that the example second and third additional derivative process values are reliable, and/or determines at block 408 that the first sensor 104 is not functioning properly and that the second and third sensors 106, 108 are functioning properly, the controller 116 may generate one or more notification(s) and/or message(s) indicating that the example first derivative process value is unreliable, that the example second and/or third additional derivative process values are reliable, that the first sensor 104 is not functioning properly, and/or that the second and/or third sensors 106, 108 are functioning properly. Following block 410, the example method 308 ends and control returns to a calling function or process such as the example method 300 of FIG. 3.

Figure 5:
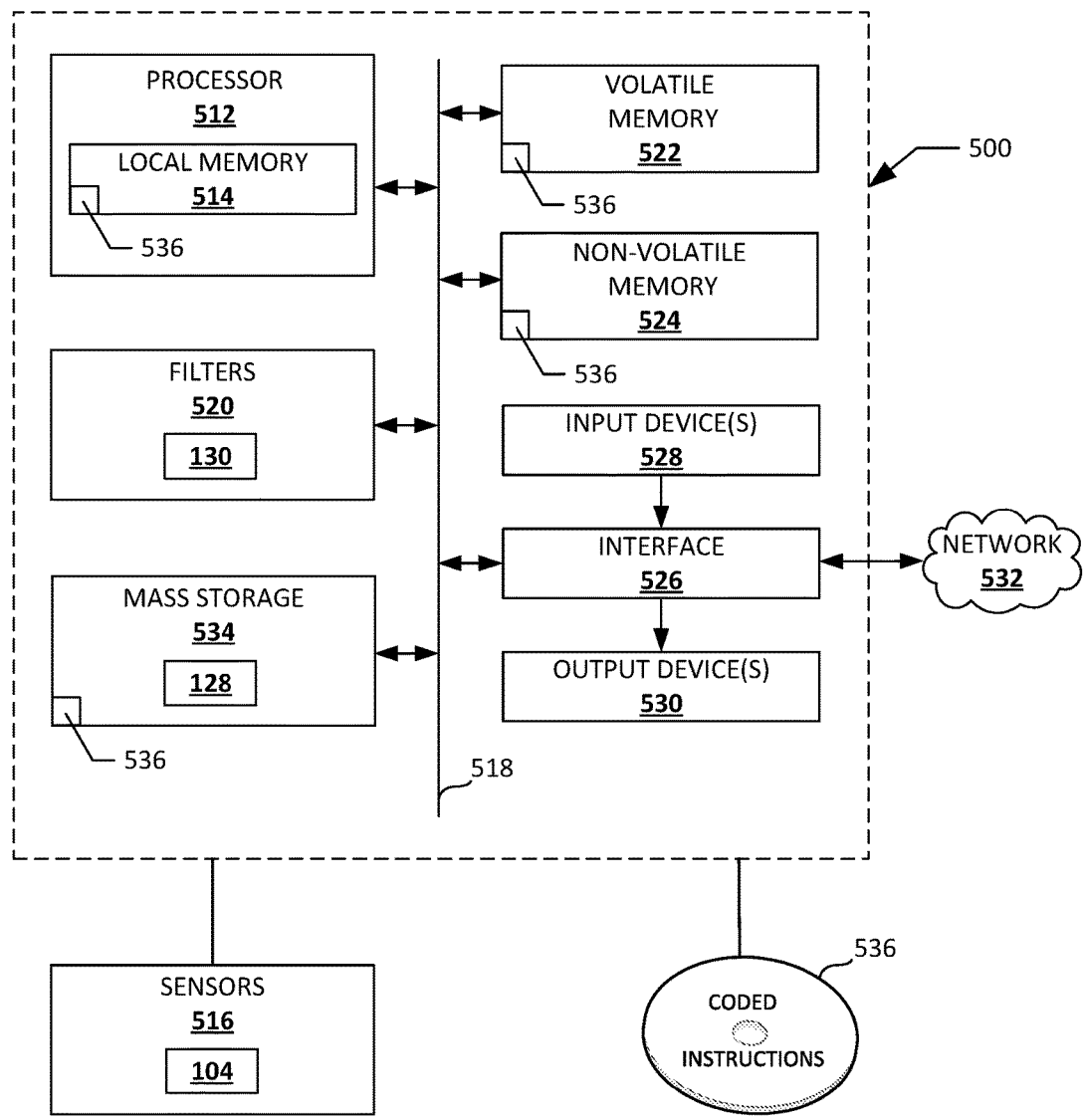
FIG. 5 is an example processor platform capable of executing instructions to implement the method of FIG. 2 and any of the example first, second or third transmitters of FIG. 1.

FIG. 5 is an example processor platform 500 capable of executing instructions to implement the method of FIG. 2 and any of the example first, second or third transmitters 110, 112, 114 of FIG. 1. The processor platform 500 can be, for example, a printed circuit board, a transmitter, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. The example processor 512 includes a local memory 514 (e.g., a cache).

The processor 512 and/or, more generally, the processor platform 500 of the illustrated example is operatively coupled to and/or in communication with one or more example sensors 516. In some examples, the sensors 516 may be in communication with the processor 512 and/or the processor platform 500 via a bus 518. The example sensors 516 include the example first sensor 104 of FIG. 1.

The processor 512 of the illustrated example is also in communication with one or more example filters 520 via the bus 518. The example filters 520 include the example filter 130 of FIG. 1.

The processor 512 of the illustrated example is also in communication with a main memory including a volatile memory 522 and a non-volatile memory 524 via the bus 518. The volatile memory 522 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 524 may be implemented by flash memory and/or any other desired type of memory device. Access to the main memory 522, 524 is controlled by a memory controller.

The processor platform 500 of the illustrated example also includes an interface circuit 526. The interface circuit 526 may be implemented by any type of interface standard, such as an Ethernet interface, a universal serial bus (USB), and/or a PCI express interface. In the illustrated example, one or more input devices 528 are connected to the interface circuit 526. The input device(s) 528 permit(s) a user to enter data and commands into the processor 512. The input device(s) can be implemented by, for example, one or more buttons, one or more switches, a keyboard, a mouse, a microphone and/or a liquid crystal display having a touchscreen. One or more output devices 530 are also connected to the interface circuit 526 of the illustrated example. The output devices 530 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. Thus, the interface circuit 526 of the illustrated example may include a graphics driver card, a graphics driver chip or a graphics driver processor.

In the illustrated example, the interface circuit 526 also facilitates the exchange of data and/or signals with external machines such as the example controller 116 of FIG. 1 via a network 532. In some examples, the network 532 may be facilitated via 4-20 mA wiring and/or via one or more communication protocol(s) including, for example, Foundation Fieldbus, HART, Transmission Control Protocol/Internet Protocol (TCP/IP), Profinet, Modbus and/or Ethernet.

The processor platform 500 of the illustrated example also includes one or more mass storage devices 534 for storing software and/or data. Examples of such mass storage devices 534 include floppy disk drives, hard drive disks, compact disk drives, Blu-ray disk drives, RAID systems, and digital versatile disk (DVD) drives. In the illustrated example, the mass storage device 534 includes the example memory 128 of FIG. 1.

Coded instructions 536 to implement the method of FIG. 2 may be stored in the local memory 514, in the volatile memory 522, in the non-volatile memory 524, in the mass storage device 534, and/or on a removable tangible computer readable storage medium such as a CD or DVD.

Figure 6:
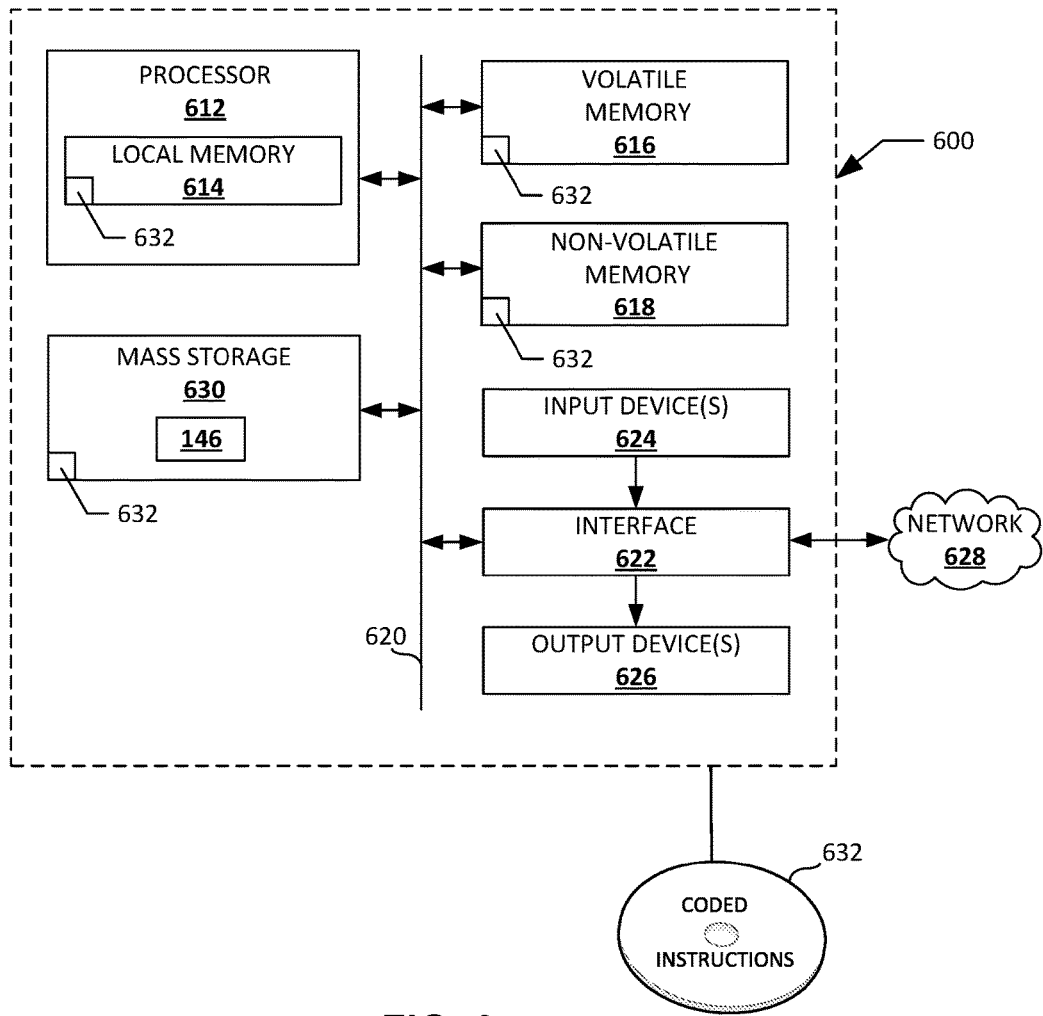
FIG. 6 is an example processor platform capable of executing instructions to implement the methods of FIGS. 3 and 4 and the example controller of FIG. 1.

FIG. 6 is an example processor platform 600 capable of executing instructions to implement the methods of FIGS. 3 and 4 and the example controller 116 of FIG. 1. The processor platform 600 can be, for example, a printed circuit board, a controller, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The example processor 612 includes a local memory 614 (e.g., a cache).

The processor 612 of the illustrated example is in communication with a main memory including a volatile memory 616 and a non-volatile memory 618 via a bus 620. The volatile memory 616 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 618 may be implemented by flash memory and/or any other desired type of memory device. Access to the main memory 616, 618 is controlled by a memory controller.

The processor platform 600 of the illustrated example also includes an interface circuit 622. The interface circuit 622 may be implemented by any type of interface standard, such as an Ethernet interface, a universal serial bus (USB), and/or a PCI express interface. In the illustrated example, one or more input devices 624 are connected to the interface circuit 622. The input device(s) 624 permit(s) a user to enter data and commands into the processor 612. The input device(s) can be implemented by, for example, one or more buttons, one or more switches, a keyboard, a mouse, a microphone and/or a liquid crystal display having a touchscreen. One or more output devices 626 are also connected to the interface circuit 622 of the illustrated example. The output devices 626 can be implemented, for example, by one or more light emitting diode(s) for presenting visual information, one or more speaker(s) for presenting audible information, and/or a display device (e.g., a liquid crystal display, a cathode ray tube display, etc.) for presenting textual and/or graphical information. Thus, the interface circuit 622 of the illustrated example may include a graphics driver card, a graphics driver chip or a graphics driver processor.

In the illustrated example, the interface circuit 622 also facilitates the exchange of data and/or signals with external machines such as the example first, second and third transmitters 110, 112, 114 and the valve 118 of FIG. 1 via a network 628. In some examples, the network 628 may be facilitated via 4-20 mA wiring and/or via one or more communication protocol(s) including, for example, Foundation Fieldbus, HART, TCP/IP, Profinet, Modbus and/or Ethernet.

The processor platform 600 of the illustrated example also includes one or more mass storage devices 630 for storing software and/or data. Examples of such mass storage devices 630 include floppy disk drives, hard drive disks, compact disk drives, Blu-ray disk drives, RAID systems, and digital versatile disk (DVD) drives. In the illustrated example, the mass storage device 630 includes the example memory 146 of FIG. 1.

Coded instructions 632 to implement the method of FIG. 2 may be stored in the local memory 614, in the volatile memory 616, in the non-volatile memory 618, in the mass storage device 630, and/or on a removable tangible computer readable storage medium such as a CD or DVD.

From the foregoing, it will be appreciated that the disclosed methods and apparatus advantageously improve the speed of a control response associated with detecting the initiation of a surge event in a compressor. The disclosed methods and apparatus achieve such an advantage by moving certain processing functions from the single controller utilized in conventional surge detection and/or surge prevention systems to a separate transmitter capable of processing data at a relatively higher rate. For example, the methods and apparatus disclosed herein include a transmitter capable of rapidly determining one or more derivative process values that, in conventional surge detection and/or surge prevention systems, would otherwise need to be determined by the controller. As a result of offloading the determination of the derivative process value(s) to a high-speed transmitter, latency issues associated with the sampling and/or processing capabilities of the dedicated controller of the aforementioned conventional systems can be avoided, and the costly dedicated controller may be replaced by a lower-cost controller having relatively slower processing capabilities.

It will also be appreciated that the example methods and apparatus disclosed herein advantageously implement redundant transmitters to verify the reliability of data determined by the transmitters. Such redundant transmitters reduce the potential that data being determined by any one of the transmitters and utilized by the controller to detect the initiation of a surge event constitutes a false-positive.

In some disclosed examples, a transmitter is to determine a derivative process value of a compressor. In some disclosed examples, a sensor is operatively coupled to the transmitter. In some disclosed examples, the sensor is to measure a first process value of the compressor and a second process value of the compressor. In some disclosed examples, the derivative process value is determined based on the first and second process values. In some disclosed examples, the first and second process values are pressure values and the derivative process value is a derivative pressure value. In other disclosed examples, the first and second process values are flow rate values and the derivative process value is a derivative flow rate value.

In some disclosed examples, a controller is to obtain the derivative process value from the transmitter. In some disclosed examples, the transmitter is separate from the controller. In some disclosed examples, the controller is to compare the derivative process value to a threshold value. In some disclosed examples, the threshold value is indicative of the initiation of a surge event in the compressor.

In some disclosed examples, in response to determining that the derivative process value fails to satisfy the threshold value, the controller is to actuate a valve operatively coupled to the compressor to enable an additional derivative process value of the compressor determined by the transmitter to satisfy the threshold value. In some disclosed examples, in response to determining that the derivative process value fails to satisfy the threshold value, the controller is to use the derivative process value as an input to a surge detection algorithm that controls the actuation of the valve. In some disclosed examples, the controller is to additionally use the derivative process value as an input to a closed-loop anti-surge algorithm that controls the actuation of the valve.

In some disclosed examples, the transmitter is to determine the additional derivative process value. In some disclosed examples, the controller is to obtain the additional derivative process value from the transmitter. In some disclosed examples, the controller is to compare the additional derivative process value to the threshold value to determine if the additional derivative process value satisfies the threshold value.

In some disclosed examples, the sensor is a first sensor and the transmitter is a first transmitter. In some disclosed examples, a second sensor is operatively coupled to a second transmitter. In some disclosed examples, the second sensor is to measure a third process value of the compressor and a fourth process value of the compressor. In some disclosed examples, the second transmitter is to determine a second additional derivative process value based on the third and fourth process values.

In some disclosed examples, a third sensor is operatively coupled to a third transmitter. In some disclosed examples, the third sensor is to measure a fifth process value of the compressor and a sixth process value of the compressor. In some disclosed examples, the third transmitter is to determine a third additional derivative process value based on the fifth and sixth process values.

In some disclosed examples, the controller is to obtain the second additional derivative process value from the second transmitter and the third additional derivative process value from the third transmitter. In some disclosed examples, the controller is to compare two or more of the derivative process value, the second additional derivative process value and the third additional derivative process value to determine a functional status of one or more of the first, second or third sensors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a sensor to measure a first pressure value of a compressor and a second pressure value of the compressor;
    a transmitter operatively coupled to the sensor and configured to process data at a first processing rate, the transmitter to:
        calculate a derivative pressure value of the compressor based on the first and second pressure values, the derivative pressure value being calculated at the first processing rate to reduce a latency associated with calculating the derivative pressure value at a second processing rate less than the first processing rate; and
        transmit the derivative pressure value; and
    a controller operatively coupled to and separate from the transmitter and configured to process data at the second processing rate, the controller to:
        receive the derivative pressure value calculated by and transmitted from the transmitter;
        compare the derivative pressure value to a threshold value; and
        in response to determining that the derivative pressure value fails to satisfy the threshold value, actuate a valve operatively coupled to the compressor to enable an additional derivative pressure value of the compressor subsequently calculated by and transmitted from the transmitter to satisfy the threshold value.

2. The apparatus of claim 1, wherein the threshold value is indicative of initiation of a surge event in the compressor.

3. The apparatus of claim 1, wherein, in response to determining that the derivative pressure value fails to satisfy the threshold value, the controller is to use the derivative pressure value as an input to a surge detection algorithm that controls the actuation of the valve.

4. The apparatus of claim 3, wherein, in response to determining that the derivative pressure value fails to satisfy the threshold value, the controller is to further use the derivative pressure value as an input to a closed-loop anti-surge algorithm that controls the actuation of the valve, the closed-loop anti-surge algorithm being separate from the surge detection algorithm, the surge detection algorithm having a rate of operation that exceeds a rate of operation of the closed-loop anti-surge algorithm.

5. The apparatus of claim 1, wherein the transmitter is to:
    calculate the additional derivative pressure value; and
    transmit the additional derivative pressure value;
    and wherein the controller is to:
        receive the additional derivative pressure value calculated by and transmitted from the transmitter; and
        compare the additional derivative pressure value to the threshold value to determine if the additional derivative pressure value satisfies the threshold value.

6. The apparatus of claim 1, wherein the sensor is a first sensor and the transmitter is a first transmitter, the apparatus further including:
    a second sensor operatively coupled to a second transmitter, the second sensor to measure a third pressure value of the compressor and a fourth pressure value of the compressor, the second transmitter to calculate a second additional derivative pressure value based on the third and fourth pressure values, the second transmitter to transmit the second additional pressure value; and
    a third sensor operatively coupled to a third transmitter, the third sensor to measure a fifth pressure value of the compressor and a sixth pressure value of the compressor, the third transmitter to calculate a third additional derivative pressure value based on the fifth and sixth pressure values, the third transmitter to transmit the third additional pressure value.

7. The apparatus of claim 6, wherein, the controller is to:
    receive the second additional derivative pressure value calculated by and transmitted from the second transmitter;
    receive the third additional derivative pressure value calculated by and transmitted from the third transmitter; and
    compare two or more of the derivative pressure value, the second additional derivative pressure value and the third additional derivative pressure value to determine a functional status of one or more of the first, second or third sensors.

8. The apparatus of claim 3, wherein the surge detection algorithm is to generate an instruction to determine an extent to which the valve is to be opened or closed.

9. The apparatus of claim 4, wherein the closed-loop anti-surge algorithm is to generate an instruction to determine an extent to which the valve is to be opened or closed.

10. A method comprising:
    calculating, at a transmitter configured to process data at a first processing rate, a derivative pressure value based on a first pressure value and a second pressure value of a compressor measured at a sensor operatively coupled to the transmitter, the derivative pressure value being calculated at the first processing rate to reduce a latency associated with calculating the derivative pressure value at a second processing rate less than the first processing rate;
    transmitting the derivative pressure value from the transmitter;
    receiving, at a controller operatively coupled to and separate from the transmitter and configured to process data at the second processing rate, the derivative pressure value calculated by and transmitted from the transmitter;
    comparing the derivative pressure value to a threshold value; and
    in response to determining that the derivative pressure value fails to satisfy the threshold value, actuating a valve operatively coupled to the compressor to enable an additional derivative pressure value of the compressor subsequently calculated by and transmitted from the transmitter to satisfy the threshold value.

11. The method of claim 10, wherein the threshold value is indicative of initiation of a surge event in the compressor.

12. The method of claim 10, further including:
    calculating the additional derivative pressure value at the transmitter;

transmitting the additional derivative pressure value from the transmitter;

receiving, at the controller, the additional derivative pressure value calculated by and transmitted from the transmitter; and comparing the additional derivative pressure value to the threshold value to determine if the additional derivative pressure value satisfies the threshold value.

13. The method of claim 10, wherein the sensor is a first sensor and the transmitter is a first transmitter, the method further including:

receiving, at the controller, a second additional derivative pressure value of a compressor calculated by and transmitted from a second transmitter, the second transmitter being operatively coupled to and separate from the controller, the second transmitter being separate from the first transmitter, the second additional derivative pressure value being based on a third pressure value of the compressor and a fourth pressure value of the compressor, the third and fourth pressure values being measured using a second sensor operatively coupled to the second transmitter; and receiving, at the controller, a third additional derivative pressure value of a compressor calculated by and transmitted from a third transmitter, the third transmitter being operatively coupled to and separate from the controller, the third transmitter being separate from the first transmitter and separate from the second transmitter, the third additional derivative pressure value being based on a fifth pressure value of the compressor and a sixth pressure value of the compressor, the fifth and sixth pressure values being measured using a third sensor operatively coupled to the third transmitter.

14. The method of claim 13, further including comparing two or more of the derivative pressure value, the second additional derivative pressure value and the third additional derivative pressure value to determine a functional status of one or more of the first, second or third sensors.

15. A non-transitory tangible machine-readable storage medium comprising instructions that, when executed, cause a machine to, at least:

calculate, at a transmitter configured to process data at a first processing rate, a derivative pressure value based on a first pressure value and a second pressure value of a compressor measured at a sensor operatively coupled to the transmitter, the derivative pressure value being calculated at the first processing rate to reduce a latency associated with calculating the derivative pressure value at a second processing rate less than the first processing rate;

transmit the derivative pressure value from the transmitter;

receive, at a controller operatively coupled to and separate from the transmitter and configured to process data at the second processing rate, the derivative pressure value calculated by and transmitted from the transmitter;

compare the derivative pressure value to a threshold value; and in response to determining that the derivative pressure value fails to satisfy the threshold value, actuate a valve operatively coupled to the compressor to enable an additional derivative pressure value of the compressor subsequently calculated by and transmitted from the transmitter to satisfy the threshold value.

16. The machine-readable storage medium of claim 15, wherein the threshold value is indicative of initiation of a surge event in the compressor.

17. The machine-readable storage medium of claim 15, wherein the instructions, when executed, cause the machine, in response to determining that the derivative pressure value fails to satisfy the threshold value, to use the derivative pressure value as an input to a surge detection algorithm that controls the actuation of the valve.

18. The machine-readable storage medium of claim 17, wherein the instructions, when executed, cause the machine, in response to determining that the derivative pressure value fails to satisfy the threshold value, to further use the derivative pressure value as an input to a closed-loop anti-surge algorithm that controls the actuation of the valve, the closed-loop anti-surge algorithm being separate from the surge detection algorithm, the surge detection algorithm having a rate of operation that exceeds a rate of operation of the closed-loop anti-surge algorithm.

19. The machine-readable storage medium of claim 17, wherein the surge detection algorithm is to generate an instruction to determine an extent to which the valve is to be opened or closed.

20. The machine-readable storage medium of claim 18, wherein the closed-loop anti-surge algorithm is to generate an instruction to determine an extent to which the valve is to be opened or closed.

* * * * *